No. 632,779. Patented Sept. 12, 1899.
N. BURKART.
COMBINED VEHICLE BRAKE AND STEP.
(Application filed Feb. 7, 1899.)
(No Model.)
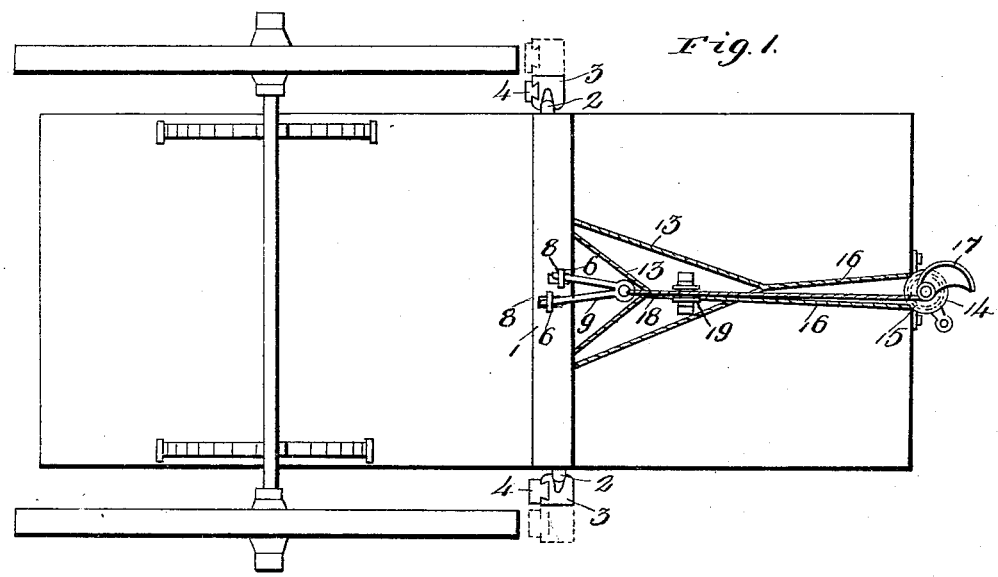
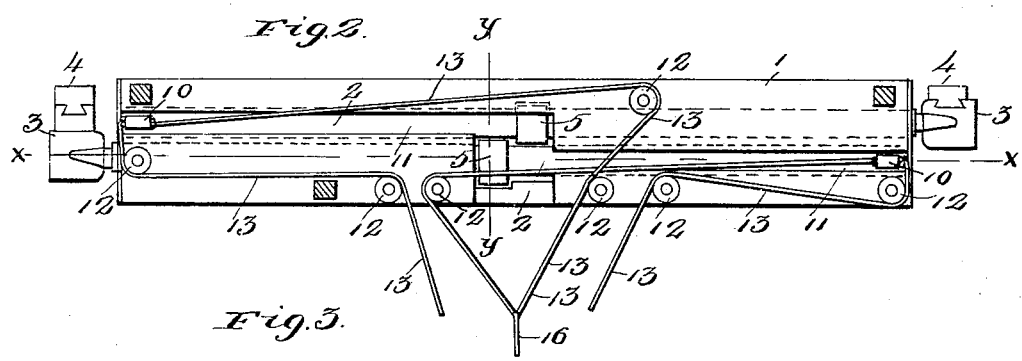
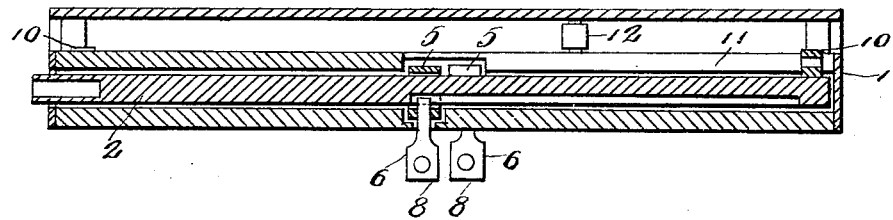
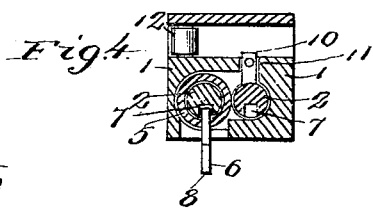
WITNESSES:
INVENTOR
Nicolas Burkart.
BY
ATTORNEYS.

UNITED STATES PATENT OFFICE.

NICOLAS BURKART, OF HOUSE SPRINGS, MISSOURI, ASSIGNOR, BY DIRECT AND MESNE ASSIGNMENTS, OF ONE-HALF TO PETER MAUER, OF MANCHESTER, AND JULIUS STEINMEYER, OF ST. LOUIS, MISSOURI.

COMBINED VEHICLE BRAKE AND STEP.

SPECIFICATION forming part of Letters Patent No. 632,779, dated September 12, 1899.

Application filed February 7, 1899. Serial No. 704,816. (No model.)

*To all whom it may concern:*

Be it known that I, NICOLAS BURKART, a citizen of the United States, residing at House Springs, in the county of Jefferson and State of Missouri, have invented certain new and useful Improvements in Vehicle Brakes and Steps; and I do hereby declare the following to be a full, clear, and exact description of the invention, such as will enable others skilled in the art to which it appertains to make and use the same.

My invention relates to a combined vehicle brake and step; and it consists in the novel combination and arrangement of parts, as will be hereinafter more particularly described and claimed.

In the drawings, Figure 1 is a bottom plan view of the body and hind wheels of a vehicle, showing my invention applied thereto and in a position to be used as a step, also showing in dotted lines the position of the steps when used as a brake. Fig. 2 is a plan view showing the upper portion of the housing of my invention removed. Fig. 3 is a longitudinal section taken on the line $x\ x$ of Fig. 2, and Fig. 4 is a cross-section taken on the line $y\ y$ of Fig. 2.

The object of my invention is to construct a combined vehicle step and brake in such a manner that when the same is properly attached to the under surface of a vehicle-body and the same is in a closed position a step on either side of the body is provided and are located adjacent to the sides thereof; but when the said steps are forced outwardly, by the mechanism hereinafter to be described, and brought in line with the hind wheels the same may be brought in contact with the tires of said wheels, and thereby operate as a brake.

Referring to the drawings, 1 represents a box or housing, the length of which extends, preferably, the width of the body of the vehicle and is secured to the lower surface of the same by any suitable means, the said box being located a little forward of the tread portion of the hind wheels in order that the brakes may be effectually operated against the same.

Slidingly located within the lower portion of the box 1 and arranged side by side are two rods 2, which are similarly constructed, and to the outer ends of the same are secured steps 3, which are of the usual design, the edges of which or that edge adjacent to the hind wheels being provided with shoes 4, which are adapted to be brought in contact with the tires of the hind wheels when the said steps are forced outwardly and desired to be used as a brake.

Located within the box or housing and arranged at the center thereof are two collars 5, through which the rods 2 are slidingly operated, and passing through the bottom of said collars are arms 6, the upper ends of which are located within grooves 7, formed in said rods 2 and having their lower ends 8 projecting a suitable distance, to which are attached the ends of a V-shaped lever 9, which is adapted to be operated in such a manner as to slightly turn said collars simultaneously, and consequently operate said rods in a like manner when the same are forced out from the box and the brakes designed to be brought against the hind wheels of the vehicle.

Secured to the inner ends of the rods 2 and projecting upwardly therefrom are pins 10, which are adapted to slide within the slots 11, formed in the housing 1, which when the said rods are completely located within the said housing will be located within said slots and prevent the rods from being rotated; but when said rods are forced outwardly or in a position to be operated as a brake the said pins will be forced out of the slots and be free to be turned in either direction for turning the rods.

Secured within the housing 1 are a series of rollers 12, which are properly arranged, as shown in the drawings, over which an endless rope 13 is adapted to pass and to which the pins 10 of the rods 2 are attached.

To the front portion of the vehicle-body is secured a vertical operating-shaft 14, and to the lower projecting end of the same is secured a drum 15, around which is wound a rope 16, the opposite ends of which are attached to the two loops of the endless rope 13, whereby when the operating-shaft is turned in one direction the steps will be forced outwardly to be operated as a brake, and when the same is turned in the opposite direction the said rods will be drawn within the box and the steps be located adjacent to the sides of the vehicle-body and operate for the purpose previously described; also, secured to the operating-shaft and located adjacent to the drum 15 (or the same may form an integral part of the said drum) is a grooved cam 17, to which is attached one end of the rope 18, the opposite end of which is attached to the end of the V-shaped lever 9, said rope passing over a pulley 19, projecting from the bottom of the vehicle-body, whereby when the said operating-shaft is turned to cause the brakes to be brought in a line with the hind wheels the said cam will operate to turn the shafts and bring the shoes 4 in contact with the tires of said wheels and provide the necessary amount of friction thereto.

I wish it distinctly understood that I do not limit myself to the mechanism herein shown and described for operating the shafts or rods 2, as the same may be varied without departing from the nature of my invention, the principal object being to provide a step for a vehicle which when forced outwardly or in a line with the hind wheels of the vehicle may be operated or used as a brake, and the construction herein shown for accomplishing this purpose.

Having fully described my invention, what I claim is—

1. A combined vehicle step and brake comprising a suitable housing or box, adapted to be secured to the vehicle-body, slidingly-operated rods located within said housing, steps secured to the outer ends of the same, and provided with shoes, means for preventing said rods from being turned when in a closed position, and suitable mechanism for operating said rods simultaneously in a longitudinal direction, and further, rotating the same when in an open position, as and for the purpose described.

2. A combined vehicle step and brake, comprising a suitable box or housing, slidingly-operated rods located within the same, steps secured to the outer ends of the said rods and provided with shoes, pins secured to the inner ends of said rods and adapted to slide within slots formed in said housing, collars located within the housing and located at the center thereof, arms passing through said collars, the inner ends of which are located within grooves formed in said rods, and having their lower ends projecting from said collars, a V-shaped lever, the ends of which are secured to said arms, rollers mounted within said housing, an endless rope passing around said rollers, to which the pins are secured, and suitable operating mechanism attached to the said rope and to the V-shaped lever, for operating the rods in a manner herein shown and described.

In testimony whereof I affix my signature in presence of two witnesses.

NICOLAS BURKART.

Witnesses:
W. A. SIEVERS,
A. Z. STEPHENS.